July 24, 1956 V. G. POLITSCH ET AL 2,755,703
GLASS WALL-THICKNESS GAUGING MACHINE
Filed April 10, 1952 4 Sheets-Sheet 1

Inventors
VERNEY G. POLITSCH
VINCENT J. VAN METER
RICHARD L. EARLY
By Rule and Hoge
Attorneys

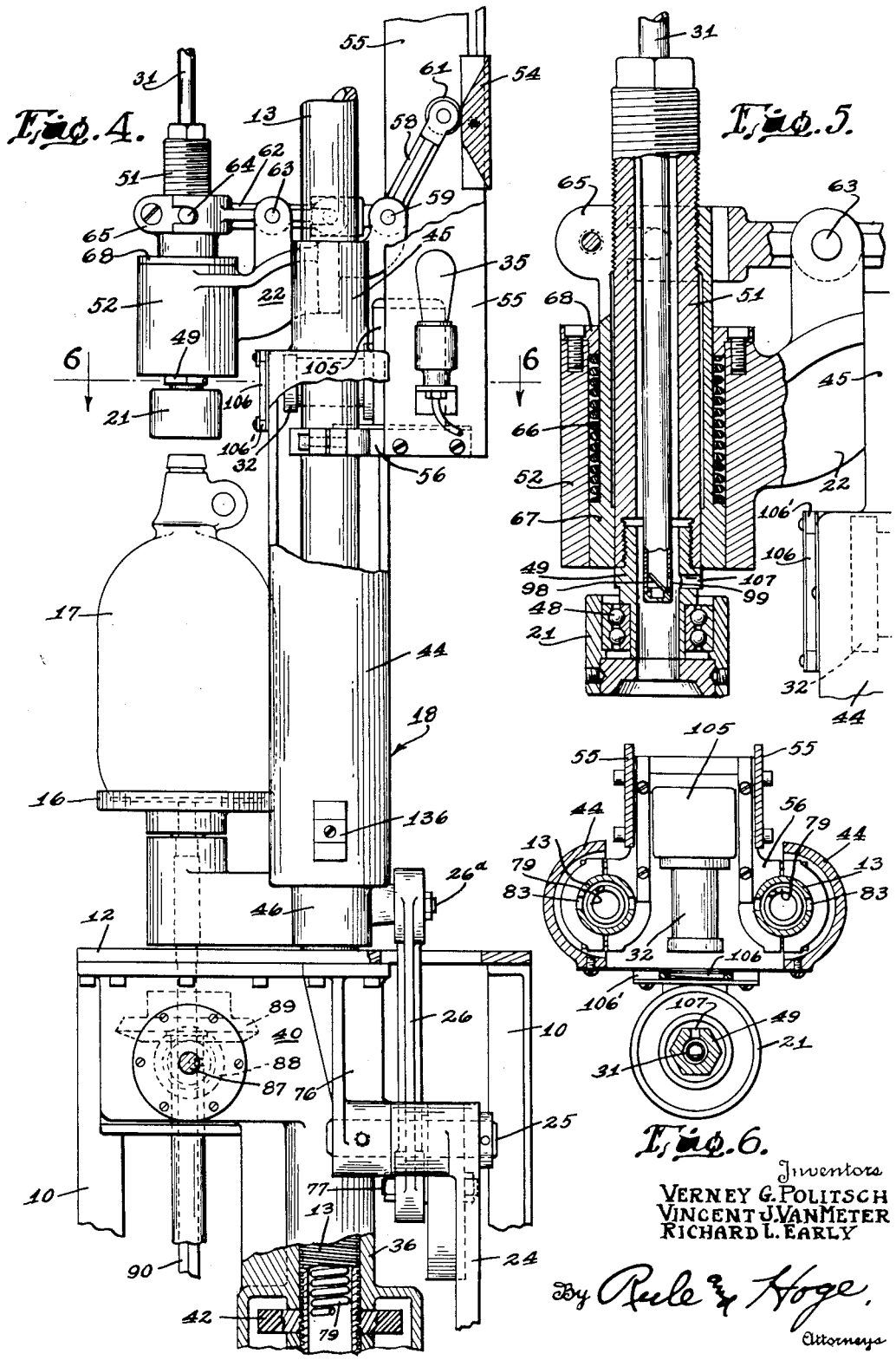

July 24, 1956    V. G. POLITSCH ET AL    2,755,703
GLASS WALL-THICKNESS GAUGING MACHINE
Filed April 10, 1952    4 Sheets-Sheet 3

Inventors
VERNEY G. POLITSCH
VINCENT J. VAN METER
RICHARD L. EARLY
By Rule and Hoge
Attorneys July 24, 1956

V. G. POLITSCH ET AL 2,755,703

GLASS WALL-THICKNESS GAUGING MACHINE

Filed April 10, 1952

Inventors
VERNEY G. POLITSCH
VINCENT J. VAN METER
RICHARD L. EARLY

By Rule and Hoge.

Attorneys

United States Patent Office 2,755,703
Patented July 24, 1956

2,755,703

GLASS WALL-THICKNESS GAUGING MACHINE

Verney G. Politsch, Alton, Richard L. Early, Wood River, and Vincent J. Van Meter, East Alton, Ill., assignors to Owens-Illinois Glass Company, a corporation of Ohio Application April 10, 1952, Serial No. 281,698

16 Claims. (Cl. 88—14)

Our invention relates to apparatus for testing the dimensional thickness of glass or other material which is transparent or transmits light or ultra-violet radiation. In the form herein illustrated and described, the invention is particularly adapted for gauging the wall thickness of hollow glass articles or containers such as bottles and jars, although not limited to such use.

The invention provides means for directing a beam of light or radiation of predetermined or controlled intensity against the surface of the article under test and thereby causing a portion of the light to be transmitted while another portion is absorbed by the material, the amount of absorption being proportional to the thickness of the material. The transmitted light is directed against a photoelectric cell, preferably or specifically a photo-multiplier cell. As the amount of light received by the cell varies with the thickness of the article under test, the electrical output of the cell is correspondingly varied and, when amplified may be used to operate any desired indicating device, such as a meter or signal lamp.

As herein set forth the electrical output of the photo-multiplier cell is applied to the control grid of an electron tube. The amplified output of the tube is fed into the trigger circuit of a gas filled tube and fires the latter when the output of the photo-multiplier cell reaches a value answering to a predetermined thickness of the glass or material under test. When the gas filled tube fires, the plate current is used to operate any desired signal or control means signifying that the article under test is of a predetermined thickness.

The accompanying drawings illustrate a machine embodying the present invention, particularly designed for testing the wall thickness of a hollow glass container such as a bottle or jar, for discovering any spot or area in the wall surface of the jar at which the wall is below a predetermined minimum permissible thickness. The gauging machine includes a horizontally rotatable carrier for the article, a light source and a light tube through which a beam of radiation is transmitted from the light source downwardly into the container and is reflected horizontally and passes radially through the container wall and through a filter exterior to the container. A photo-multiplier cell receives the filtered light and operates as hereinafter set forth to light a signal lamp when the wall thickness is below a predetermined permissible thickness. The container carrier is rotated during the test and also moved vertically relative to the light tube so that the light beam is caused to scan the entire surface under test. When any thin spot or area in the container wall is brought into the path of the light beam, it causes a signal lamp to be lighted.

The invention further provides resetting or readjusting means by which an electronic control circuit is automatically set before each gauging cycle to compensate for any changes in the light source, changes in the amplifier, photoelectric cell or the reject circuits; all as set forth hereinafter. Such resetting means may include a tapered or wedge-shaped piece of glass or transparent material through which the light is transmitted during the resetting operation and which also provides a convenient method of adjusting the gauging apparatus so that it will give the reject signal at any desired thickness of the container wall.

Referring to the accompanying drawings:

Fig. 1 is a side elevational view of a machine for testing glass bottles or jars, the support for the latter being in its lifted position, portions of the machine being shown in section and the lower portion of the machine broken away;

Figs. 2 and 3 are sections at the lines 2—2 and 3—3 respectively on Fig. 1;

Fig. 4 is a view similar to Fig. 1, but on a larger scale and showing the container support in its lowered position;

Fig. 5 is a part sectional view of a chuck and its mounting;

Fig. 6 is a section at the line 6—6 on Fig. 4;

Figures 1, 2, 3:
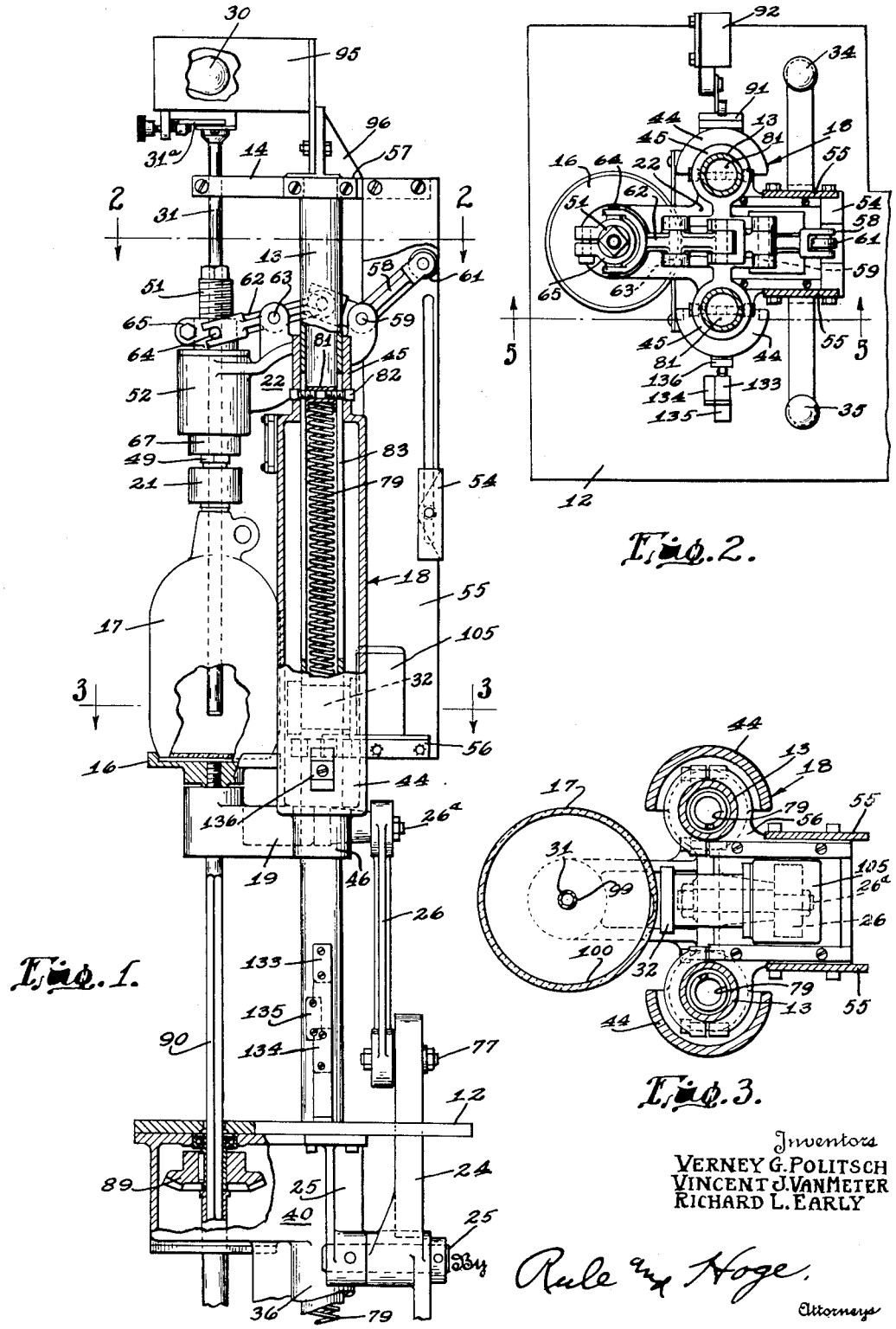

The machine comprises, in general terms, a framework 10 including the floor 11 (Fig. 7) and platform 12, a pair of vertical stationary tubular shafts or posts 13 mounted for vertical adjustment in the framework and extending below and above the platform 12, an upper platform or plate 14 attached to the upper ends of the tubes 13, a carrier 16 in the form of a circular pad for holding an article 17, here shown as a glass bottle, during the testing operation, a carriage 18 slidably mounted on the posts 13 for up-and-down movement, said carriage including a lower supporting member 19 or yoke on which the pad 16 is mounted, a chuck 21 mounted for limited up-and-down movement in a bracket 22 on the carriage 18, a cam 23 (Fig. 7) and cam controlled mechanism for lifting and lowering the carriage 18 and carrier 16, such mechanism including a rocker 24 pivoted at 25 and connected through a link 26 to the yoke 19, a light source 30 (Fig. 1) mounted on the upper platform 14, and a light tube 31 through which the light beam is transmitted downwardly into the container 17, then reflected horizontally (Fig. 9) through the wall of the container and through a pick-up unit 32 comprising a filter, to a photo-multiplier cell 33 which operates through amplifying and controlling means to light signal lamps 34 and 35 when a thin spot or area of glass in the container wall is brought into the path of the light beam.

A more detailed description of the machine and the photoelectric and electrical control systems is as follows:

The tubular shafts 13 extend downwardly below the platform 12 through cylindrical bearing sleeves 36 which form an integral part of a casting 40 bolted to the underside of the platform. The shafts 13 are manually adjustable up and down by adjusting means comprising a shaft 37 (Fig. 7) rotatable with a hand crank and transmitting motion to a pair of miter gears 38, shaft 39, pinion 41, and a pair of gears 42 which have screw-threaded connection (Fig. 8) with the screw-threaded lower end portions of the shafts 13. Adjustment of the shafts 13 by means of such gearing serves to adjust the lamp 30 and light tube 31 vertically and provides means for adjusting the height of the tube and reflector 98 while the carriage is in its lowered position.

The carriage 18 includes a pair of substantially semi-cylindrical, upright frame members 44 formed with tubular end portions 45 and 46 at their upper and lower ends respectively and having sliding connection with the stationary shafts 13. The lower bearings 46 form an integral part of the yoke 19.

The chuck 21 is provided with ball bearings 48 (Fig. 5) for free rotation with the rotating workpiece 17 and is connected by a coupler 49 to a tubular shaft or stem 51 mounted for up-and-down movement within a cylindrical head or carrier 52 for moving the chuck vertically into and out of engagement with the article 17. The head 52 is formed on the bracket 22 which is connected to and forms a part of the carriage 18.

Means for moving the chuck up and down relative to the carriage, comprises a stationary cam 54 attached to a pair of parallel, vertical plates 55 secured to the shafts 13 by clamps 56 and 57 at their lower and upper ends respectively. The cam 54 is adjustable up and down. A bell crank lever 58 pivoted at 59 to the bracket 22, carries a cam follower roll 61. The bell crank 58 has a toggle connection with an arm 62 pivoted at 63 to the bracket 22 and at its outer end connected through a pin 64 to a strap 65 threaded on and clamped to the upper threaded end portion of the stem 51. This connection permits vertical adjustment of the chuck 21 to accommodate articles of different heights.

The chuck is held with a yielding pressure against the article 17 by means of a coil spring 66 (Fig. 5). A sleeve 67 attached to the stem 51 by means of the strap 65 integral therewith, extends downward through the head 52 and provides a pocket in which the coil spring 66 is mounted. The spring is held under compression between a shoulder formed on the sleeve 67 and a collar 68 bolted to the upper end of the head 52. When the carriage is moved downward after a gauging operation, the cam follower roll 61 engages the cam 54 and during the final downward movement, operates through the levers 58 and 62 to lift the chuck 21 away from the article 17 (as shown in Fig. 4), permitting the article to be removed and replaced by another.

The mechanism for lifting and lowering the carriage 18 is power driven, the power being transmitted through the cam 23 which is rotated continuously. The cam 23 is mounted on a shaft 71 (Fig. 7) rotated continuously by a motor (not shown) which drives a belt 72 running on a pulley 73 having driving connection with the cam shaft 71 through gearing within a gear box 74. The cam operates through a follower roll 75 on the rocker 24 which is pivoted on a hanger 76. The rocker 24 is adjustably connected to the link 26 by a pivot pin 77 adjustable along a slot 78 in the rocker. The slot is arc-shaped and concentric with the upper pivot 26ᵃ of the link 26 when the carriage is in its lowered position (Fig. 7) which is unchanged by adjustment of the link which adjusts the uppermost position of the carriage.

Figures 7, 8:
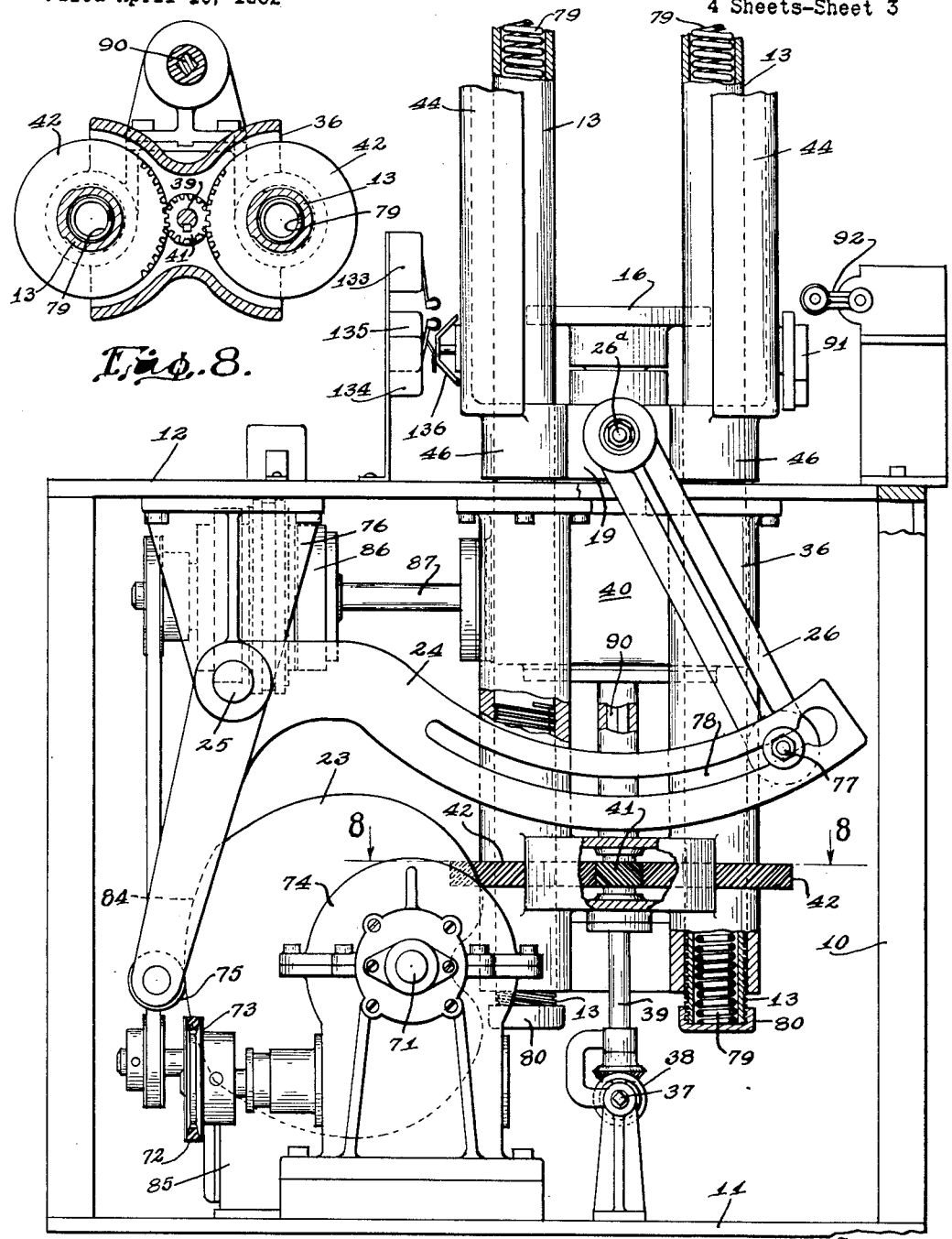
Fig. 7 is a front elevational view of the machine with parts broken away, showing particularly the cam means for lifting and lowering the work holding pad or carrier.
Fig. 8 is a section at the line 8—8 on Fig. 7, showing manually operable gear mechanism for adjusting the light tube to different heights.

The cam follower roll 75 is held on the cam by means of coil springs 79 within the tubular shafts 13 and extending from the lower ends of the shafts to points adjacent to the upper end of the carriage 18. The springs 79 are held under compression between caps 80 on the lower ends of the shafts 13 and caps 81 (Fig. 1) slidably mounted within the shafts. The caps 81 are attached by screw bolts 82 to the sleeve sections 45 of the carriage for up-and-down movement with the carriage. The shafts 13 are formed with vertical slots 83 (Fig. 1) along which the bolts 82 are slidable during the up-and-down movement of the carriage. The coil springs 79 are under sufficient compression to lift the carriage while the cam 23 rotates; the springs being compressed by the cam during the downward movement of the carriage. As the carriage reaches the limit of its downward movement (as shown in Fig. 7), the cam follower roll 75 engages a dwell portion 84 of the cam which is concentric with the shaft 71 and thereby holds the pad 16 in its down position for a sufficient length of time for the operator to remove the container 17 and place another one on the pad. During this time the chuck 21 is held in its lifted position by the cam 54 as above described.

The work holding pad 16 is rotated intermittently, being held stationary while in its lowered position and rotated continuously during the testing operation. The means for rotating the pad comprises a motor 85 (Fig. 9) which runs continuously and is intermittently connected through an electromagnetic clutch 86 to a drive shaft 87 operating through a pair of miter gears 88 and 89 to rotate a vertical shaft 90 to the upper end of which the pad is attached (Fig. 1). The shaft 90 is squared to provide a driving connection with the gear 89 permitting the shaft to move up and down with the carriage. The clutch is automatically released for stopping the rotation of the pad and maintaining it at rest while the carriage is in its lowered position. The means for releasing the clutch comprises a cam 91 (Figs. 7 and 9) mounted on the carriage in position to operate a switch 92 and open the electromagnet circuit of a relay 93 which controls the clutch circuit as hereinafter described.

The light source 30 consists of an electric lamp in a box 95 attached to a stationary bracket 96. This may be a mercury arc lamp supplying ultra-violet radiation of a wave length transmissible through the glass wall of the article. The term "light" as herein used, is intended to include ultra-violet radiation or any radiation transmissible through the wall of the article under test and is not limited to radiation within the visible range. The light source chosen will be determined to some extent by the characteristics of the particular kind of glass or material which is being gauged.

The light beam from the lamp 30 is directed downwardly through an adjusting device 31ᵃ by which the amount of light transmitted is regulated, and through the bore of the opaque light tube 31 to a mirror 98 (Figs. 5 and 9) preferably aluminum, positioned at an angle of 45° to reflect the light horizontally through an aperture 99 in the tube and thence through the wall 100 of the container 17 and through the pick-up unit 32 in which the light is filtered. In this unit the light passes through a thin disk 101 of glass and through a comparatively long filter 102 containing nickel chloride liquid and then through condensing lenses 103 which may consist of quartz. The filtered light beam is directed against the light sensitive cathode 104 of the photoelectric multiplier cell 33. A portion of the radiation from the lamp 30 is absorbed by the wall 100, the amount of such absorption being proportional to the thickness of the wall. The purpose of the filtering is to filter out the radiation which is transmitted freely through the glass wall 100 and thereby limit the measured light to such wave lengths as are readily absorbed by the glass which is being tested so that the light reaching the phototube is reduced by an amount proportional to the thickness of the glass wall.

During the gauging operation the container 17 is rotated at such a speed relative to that of the vertical movement that the entire side walls of the article are scanned and brought within the range of the light beam except the wall portions below and outside of the range of the light beam. Inspection of these lower wall portions is unnecessary with glass bottles such as shown, as they are always of sufficient thickness to meet standard requirements. Adjustments may be made for extending the scanning to include the lower portions of the walls when desirable. The photoelectric cell 33 is enclosed in a light-tight cell box 105 (Fig. 1) and the only light received by the cell comes through the filters and lenses above described.

The resetting and adjusting means by which the controls are reset and adjusted for each gauging operation includes a resetting element in the form of a piece of sheet glass 106 (Figs. 4, 5, and 6) mounted in guideway 106' on the carriage near the upper end thereof and is slidable for adjustment in the guideways 106'. The glass herein referred to as the resetting glass, is wedge-shaped with its major faces tapered and (as is shown in Fig. 5) is in line with the reflector 98 and filter unit 32 when the carriage is in its lowered position. An aperture 107 in the coupler is in register with the aperture 99 and permits the light beam to be transmitted through the wedge plate 106 and filter unit 32 while the carriage is at rest in its lowered position. The material forming the resetting element 106 may be the same as that of the articles 17 which are being tested, whether glass or some other material. This wedge piece is so adjusted that the portion through which the light beam passes is of the same thickness as the minimum permissible wall thickness of the articles being tested. This wedge-shaped glass provides a convenient means for adjusting the gauging operation for any desired wall thickness.

The electric signaling and controlling apparatus and its operation may be described as follows:

Alternating current is supplied through the output mains $a$, $b$ of a constant voltage transformer 110 to transformers 111, 112, and 113. The transformer 111 supplies voltage to the rectifier tube 114 and filter network 115 to operate the photo-multiplier cell 33. This cell may be of well known construction comprising dynodes, numbered 1 to 9, connected in series through resistances 116 in the dynode circuit, the series extending between the terminals 10' and 11'. The transformer 112 and its adjoining rectifier tube 118 and filter network 119 supply the plate voltage and a positive bias voltage to an electron tube 120 herein shown as a triode. The plate circuit of the tube 120 includes variable resistances 121 and 122. A potentiometer comprising a variable resistance 123 is connected between the control grid 125 and the cathode 126. A switch 127 is operable to introduce a resistance 124 when desired. This adapts the apparatus for testing different materials having different light transmission properties. With the switch in the position shown it is adapted for gauging clear glass such as flint glass. The switch may be reversed for gauging amber glass, for example.

The tube 120 receives the signal from the photo-multiplier cell 33 through the wire 128 and amplifies it. The amplified signal is sent out through a conductor 130 to the control grid 132 of a gas filled tube or Thyratron 131. The potentiometer 123 and switch 127 for providing positive bias to the control grid 125 permit adjustment of the amplifier over a wide range of light intensities thus allowing the gauge to operate on either clear or colored glass as above indicated, or other materials of various light transmission properties.

The full wave rectifier 117 rectifies voltage supplied by the transformer 113. The rectified voltages are filtered by condensers C1 and C2 and through a filter choke L–1. Tubes V–1 and V–2 regulate and hold constant, the filtered voltage between the + and − points at terminals of these tubes. This provides the D. C. voltage supply for the Thyratron 131 and the tube 156 which, as hereafter described, provides grid bias control for the tube 131.

The automatic reset circuits for the resetting mechanism which operates after each gauging cycle and the reject circuit for the signal lights will be understood from the following description.

During the final downward movement of the bottle carrier 16 after the side wall of the bottle has been completely gauged, a series of switches, including the relay switch 92 above referred to, a plate microswitch 133, a discharge microswitch 134, and the reset microswitch 135, are operated in succession by cams on the carriage, including the cam 91 and a cam 136. The cam 91 operates first and opens the switch 92 which remains open until the carrier 16 is again lifted. The switch 92 thus opens the circuit of the relay 93, causing the relay to move its contact bar 137 to open position. This opens the circuit of the electro-magnetic clutch 86 which is connected across the mains 138 and 139 so that the clutch is released and stops the rotation of the pad 16. The relay 93 also opens the circuit for the signal lamps at the contact bar 141. This circuit receives its current supply through wires 142 and 143 connected to the output mains $a$ and $b$ of the transformer 110.

The plate switch 133 is next opened by the cam 136 and immediately closed again as the cam passes the switch. This opens and closes the plate circuit to the Thyratron 131, but at this time there is no light on the photo-multiplier cell 33 so that the Thyratron does not fire when the plate switch is closed. This plate circuit may be traced from the plate 145 through magnet coil of a relay 146, switch 133, wire 147, variable resistance 148, and wire 148ᵃ to the cathode 149.

The cam 136 next operates to momentarily close the discharge switch 134 which is normally open. The closing of the switch short circuits and discharges a condenser 150, the short circuit extending through the wire 151, contact bar 152 of relay 146, switch 134 and wire 153. The condenser 150 is connected between the cathode 154 and control grid 155 of a triode 156, so that the discharge of the condenser 150 puts the cathode and grid at the same potential and causes the tube to conduct heavily. A resistance 160, connected between the grid 132 and cathode 149 of the Thyratron is at this time carrying the plate current of the tube 156. The plate circuit for this tube 156 may be traced from the anode 162 through resistances 163, 160, 164 and wire 165 to the cathode 154. The resistance 160 which is carrying the plate current of tube 156 is also furnishing a negative bias to the Thyratron 131. Thus the Thyratron is caused to have a high negative bias at this time.

Next the cam 136 closes the reset switch 135 as the pad 16 reaches the bottom of its stroke. At this time the light beam from the tube 31 is passing through the resetting glass 106. The condenser 150 is at this time charging through the reset microswitch 135 in a direction to lower the potential of the control grid 155 and decrease the plate current, thereby cutting down the negative bias on the Thyratron 131. At the same time the grid 132 of the Thyratron is receiving positive voltage pulses through the conductor 130. The size of these pulses depends on the amount of light reaching the photo-multiplier cell and this in turn depends upon the thickness of the resetting glass wedge through which the light is passing. When the negative bias on the Thyratron is reduced sufficiently to be overcome by the positive pulses, the Thyratron fires and operates the relay 146. The contact bar 152 thus opens the charging circuit of the condenser 150 so that the bias of the Thyratron is locked for the next gauging cycle. When the next bottle or article is gauged, any spot or area in its wall as thin or thinner than the glass wedge at the position for which it is set, will cause the Thyratron to fire as presently described and light the signal lamps 34, 35.

Figure 9:
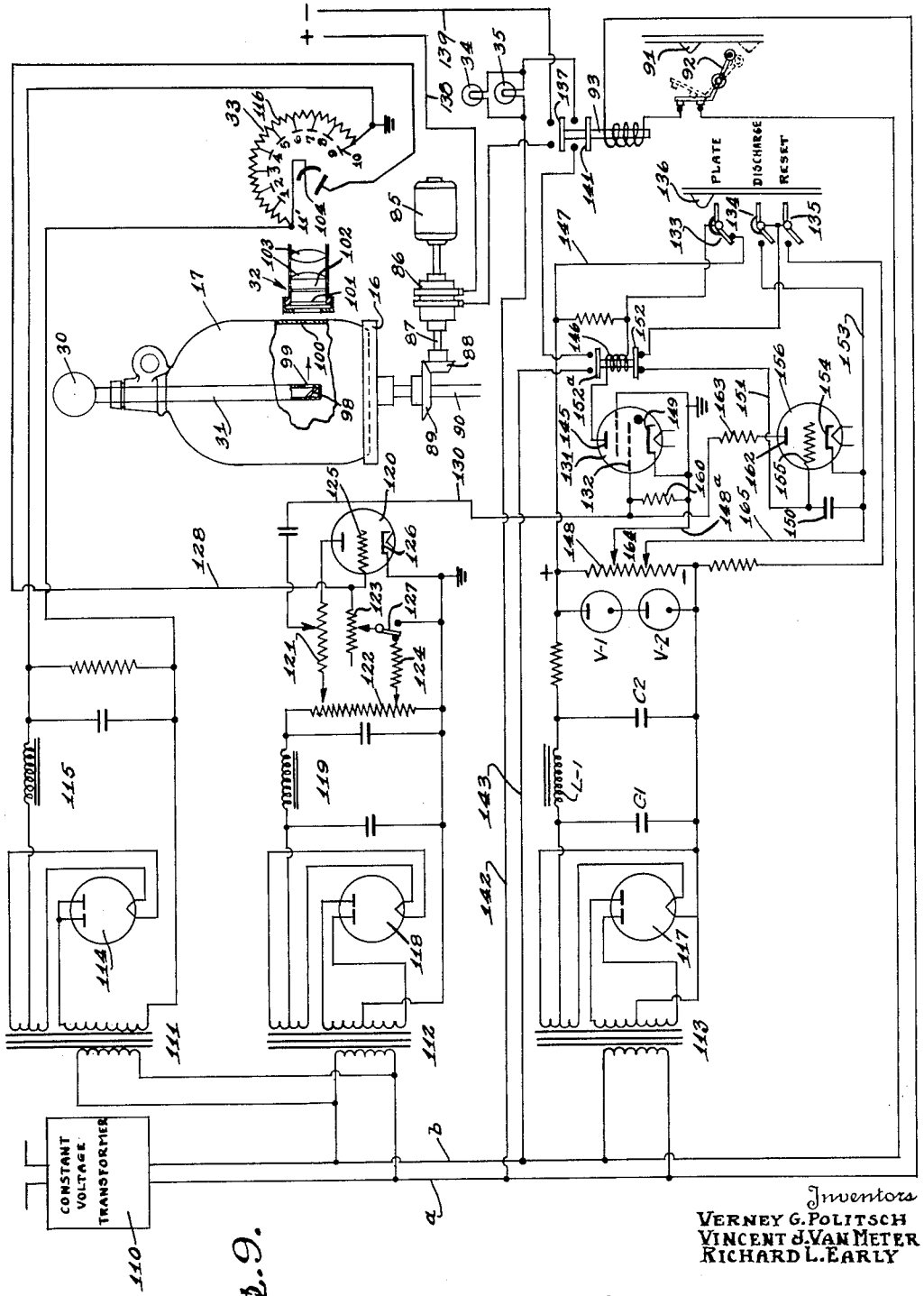
Fig. 9 is a wiring diagram of the electrical testing and control circuits, also showing diagrammatically the light transmission and photoelectric system.

While the carriage is at rest in its lowered position, the reset device having been reset during the final downward movement of the carriage as above described, the bottle which has just been gauged is removed and replaced by another. The carriage now starts its upward travel. This operates first to open the reset switch 135. Next the discharge switch 134 closes and opens. The plate switch 133 next opens and closes. This opening of the switch 133 breaks the plate circuit of the Thyratron so that the relay 146 is deenergized and assumes the position shown (Fig. 9). The cam 91 then closes the switch 92 thereby completing the circuit for the relay 93 so that the contact bars 141 and 137 are moved to closed position. The circuit for the clutch magnet is thus closed so that the pad 16 with the bottle thereon starts rotating and the wall thereof is scanned by the light beam. Any spot or area of less thickness than that for which the adjusted wedge is set, when brought into the path of the light beam, operates to fire the Thyratron as above described so that the relay 146 is energized thereby lifting the contact bar 152ª and completing the circuit through the signal lamps 34, 35 which are thus lighted and remain lighted throughout the gauging operation and until the carriage is again lowered and opens the switch 92.

Modifications may be resorted to within the spirit and scope of our invention.

We claim:

1. Apparatus for testing the wall thickness of a hollow glass article, said apparatus comprising a carriage mounted for vertical movement, a pad rotatably mounted on the carriage and forming a carrier for the article, means for lifting and lowering the carriage and thereby moving the carrier and the article thereon up and down, a lamp positioned above the said pad, a stationary support in which the lamp is mounted, a vertically disposed light tube mounted on said support and projecting downwardly in position to receive a beam of light from the lamp and transmit it downwardly into the article under test, a reflector carried by said tube in position to reflect the light beam laterally against the side wall of the article and thereby causing a portion of the light to be transmitted through said wall, means for moving the carriage up and down, means for concurrently rotating said pad and the article thereon and thereby causing the light beam to scan the side walls of the article, and a photoelectric tube in the path of the transmitted light beam.

2. The apparatus defined in claim 1 and in combination therewith a chuck mounted on the carriage and movable up and down relative thereto out of and into engagement with the said article, and automatic means for lifting the chuck when the carriage is in its lowered position.

3. The apparatus defined in claim 1 and in combination therewith a chuck, a vertical tubular spindle carrying the chuck at the lower end of said spindle, said light tube extending downwardly through the said spindle and chuck, said spindle being mounted on the carriage for up-and-down movement therewith, automatic means for lifting the spindle and chuck when the carriage is moved to its lowered position and thereby releasing the article, and means for moving the chuck downwardly relative to the carriage when the carriage commences its upward movement and thereby causing the chuck to engage and hold the article on the pad.

4. The combination set forth in claim 3, the means for lifting the chuck comprising a cam having a stationary mounting, a cam follower connected to the carriage for up-and-down movement therewith, and operating means by which movement of said follower is transmitted to the chuck spindle for effecting said movement of the chuck.

5. Apparatus for gauging the wall thickness of a bottle or other hollow article of transparent material, said apparatus comprising a carriage mounted for vertical movement, a pad for holding the article mounted on the carriage for rotation about a vertical axis, a lamp, means for supporting the lamp in a position in which it is spaced above an article on said support, a stationary light tube positioned beneath the lamp and extending downwardly into the said article and through which a light beam is transmitted from the lamp, a reflector at the lower end portion of the light tube by which the light is reflected and directed horizontally, a portion of the light beam being transmitted through the wall of the article and a portion of the light absorbed by the material forming said wall, a photoelectric cell in the path of the transmitted light, means for lifting the carriage to a position in which the light tube extends downwardly to a point near the bottom of the article of said carrier and for lowering the carriage to a position in which the said article is withdrawn below the lower end of said tube.

6. The apparatus defined in claim 5, the means for lifting and lowering the carriage including a cam mounted for rotation about an axis, means for rotating the cam about its axis, means providing a driving connection between the cam and the carriage, said cam being shaped to maintain the carriage stationary in its lowered position for a predetermined time interval permitting removal of the article from the carrier and replacement by another article.

7. The apparatus defined in claim 5, the means for lifting and lowering the carriage comprising a drive shaft, a cam mounted on said shaft, means for driving said shaft and continuously rotating the cam, means providing operating connections between the cam and carriage including a rocker, a cam follower on the rocker running on the cam, and means connecting said rocker with the carriage, said cam having a dwell portion by which the rocker is held stationary for a limited time while the carriage is in its lowermost position.

8. The apparatus defined in claim 7 including spring means for applying a continuous upward pressure to the carriage by which the cam follower is held to the cam and by which the carriage is lifted under the control of the cam.

9. The combination set forth in claim 7, the operating connections between the carriage and the cam including a link pivoted at one end to the carriage, and means providing an adjustable pivotal connection of the other end of said link to an arm of said rocker permitting adjustment along said arm in an arc concentric with said first-mentioned pivotal connection whereby adjustment of said link provides adjustment for the uppermost position of the carriage while the lower position remains constant.

10. Apparatus for gauging the wall thickness of a hollow transparent article, said apparatus comprising vertical tubular shafts, a framework in which the shafts have a stationary mounting, a carriage mounted for up-and-down movement on said shafts, coil springs within said shafts, means connecting the carriage to said springs, a carrier for said article rotatably mounted on the carriage, a lamp, a stationary light tube positioned to transmit a light beam from the lamp into the said article, means for reflecting the light beam and directing it through the wall of the article, a photoelectric cell in the path of the reflected light, a cam, means for rotating the cam about an axis, operating connections between the cam and the carriage for lowering the carriage and compressing said springs and controlling the upward movement of the carriage, said springs being under sufficient compression to lift the carriage.

11. The apparatus set forth in claim 10 and in combination therewith, a chuck mounted for up-and-down movement on the carriage out of and into position to hold the article on its carrier, means for adjusting the tubular shafts up and down within said framework, and means connecting the lamp and light tube for up-and-down adjustment with the tubular shafts.

12. Apparatus for gauging the wall thickness of a hollow transparent article, comprising a carriage mounted for up-and-down movement, a carrier mounted on the carriage for rotation about a vertical axis, means for directing a beam of light downwardly into the article on said carrier and reflecting the light horizontally and causing a portion thereof to be transmitted through the wall of said article and a portion corresponding to the thickness of the wall to be absorbed by the material forming said wall, a photoelectric cell in the path of the transmitted light, means for moving the carriage up and down, means for concurrently rotating the carrier and thereby causing the wall of said article to be scanned by the beam of light, a gas filled tube, an amplifier tube connected to receive impulses from the electrical circuit of said cell and amplifying said impulses, means for applying the amplified impulses to the control grid of said gas filled tube, a second amplifier tube, a resistance in the plate circuit of said second tube, said resistance being connected between the control grid and cathode of the gas filled tube, a condenser connected between the control grid and cathode of said second amplifier tube, an open switch in a circuit across said condenser, means operated by the carriage when it reaches a predetermined position to momentarily close said switch and thereby discharge the condenser and cause said second tube to transmit heavily, means for charging the condenser in a direction to reduce the negative bias of the gas filled tube while the latter is receiving said amplified impulses from the photoelectric cell and thereby causing the tube to fire when the negative bias is reduced sufficiently to be overcome by said impulses, and means operated by the firing of the tube to open the charging circuit of the condenser and thereby lock the bias of the gas filled tube.

13. Apparatus for gauging the wall thickness of a hollow transparent article, which apparatus comprises a carrier for the article, a carriage on which the carrier is mounted for rotation, a photoelectric cell, means for directing a beam of light through the wall of said article, said photoelectric cell being in the path of the transmitted light beam, means for moving the carriage up and down relatively to said cell and concurrently rotating the carrier and thereby causing the light beam to scan the said wall, the carrier rotating means including a motor, transmission means between the motor and said carrier for rotating the latter including an electro-magnetic clutch, means operable by the carriage when it reaches a predetermined position to establish a circuit for the clutch electromagnet and thereby establish a driving connection of the motor with the carrier, a signal device, and means in cooperative relation to said cell to actuate the signal device when any portion of the wall of less thickness than a predetermined permissible thickness comes within the path of the beam of light.

14. Apparatus for gauging the wall thickness of a hollow transparent article, which apparatus comprises a carrier for the article, a carriage on which the carrier is mounted for rotation, a photoelectric cell, means for directing a beam of light through the wall of said article, said photoelectric cell being in the path of the transmitted light beam, means for moving the carriage up and down relatively to said cell and concurrently rotating the carrier and thereby causing the light beam to scan the said wall, the carrier rotating means including a motor, transmission means between the motor and said carrier for rotating the latter including an electro-magnetic clutch, means operable by the carriage when it reaches a predetermined position to establish a circuit for the clutch electromagnet and thereby establish a driving connection of the motor with the carrier, a gas-filled tube, means for transmitting electrical pulses from the photoelectric cell and applying the same to the grid circuit of said tube and causing the tube to fire when said pulses reach a strength corresponding to a predetermined minimum permissible thickness of the said wall, a signal device, and means comprising a relay in the plate circuit of the tube to establish a circuit for said signal device when said tube fires.

15. Apparatus for gauging the wall thickness of a transparent article, which comprises a light source, means for directing a beam of light from said source against one wall surface of the article so that a portion of the radiation is absorbed and another portion transmitted through the wall, a support for the article under test, means for rotating the support and the article thereon, means for concurrently causing a relative movement of the article and the light beam in the direction of the axis of rotation and thereby causing the light beam to scan the wall surface of the article, a photo-multiplier cell in the path of the transmitted radiation, means for supplying an alternating current, means comprising a rectifier tube by which the alternating current is rectified and a pulsating current applied to the photo-multiplier cell, an amplifier tube, means for transmitting impulses from the circuit of the photo-multiplier cell to the control grid of the amplifier tube, a gas filled tube, means for applying the amplified impulses from said amplifier tube to the control grid of said gas filled tube and thereby causing the latter to be fired when the amplified impulses reach a predetermined value dependent on the wall thickness of the article and the amount of light transmitted therethrough to the photo-multiplier cell, a signal device, and means actuated by the firing of the gas filled tube to actuate said signal device.

16. Apparatus for gauging the wall thickness of a hollow transparent article, comprising a carriage mounted for up-and-down movement, a carrier mounted on the carriage for rotation about a vertical axis and on which the article is carried, means for directing a beam of light downwardly into the article on said carrier and reflecting the light horizontally and causing a portion thereof to be transmitted through the wall of said article and a portion corresponding to the thickness of the wall to be absorbed by the material forming said wall, a photoelectric cell in the path of the transmitted light, means for moving the carriage up and down, means for concurrently rotating the carrier and thereby causing the wall of said article to be scanned by the beam of light, a gas filled electron tube, means for transmitting and amplifying electrical impulses from the electric circuit of said cell and applying the amplified impulses to the control grid circuit of said tube and causing the tube to fire when the impulses from the cell circuit reach a predetermined value, detecting means brought into operation by the firing of said tube, means for resetting the gas filled tube, said resetting means including a resetting glass brought into the path of the light beam when the carrier reaches a predetermined position and absorbing a portion of the radiation corresponding to the thickness of the glass, the transmitted radiation being applied to the photoelectric cell and thereby causing positive voltage pulses from the cell circuit to be applied to the grid circuit of said tube, a second tube, a condenser connected between the grid and cathode of the second tube, means for charging the condenser in a direction to cut down the negative bias on the gas filled tube while said positive voltage pulses are being applied and thereby causing the tube to fire when the negative bias is reduced sufficiently to be overcome by the said positive voltage pulses, and electroresponsive means in the plate circuit of the gas filled tube and operable by the firing of the tube to open the charging circuit of the condenser and thereby lock the bias for the next gauging cycle.

References Cited in the file of this patent

UNITED STATES PATENTS

| Number | Name | Date |
| --- | --- | --- |
| 1,882,962 | Sawford | Oct. 18, 1932 |
| 2,044,131 | Staege | June 16, 1936 |
| 2,051,320 | States | Aug. 18, 1936 |
| 2,080,613 | Lange | May 18, 1937 |
| 2,132,447 | Stout | Oct. 11, 1938 |
| 2,287,322 | Nelson | June 23, 1942 |
| 2,349,429 | Herzog et al. | May 23, 1944 |
| 2,468,663 | Green | Apr. 26, 1949 |
| 2,481,863 | Owens | Sept. 13, 1949 |
| 2,549,402 | Vossberg | Apr. 17, 1951 |
| 2,593,127 | Fedorchak | Apr. 15, 1952 |